(12) United States Patent
Holland

(10) Patent No.: US 7,368,978 B2
(45) Date of Patent: May 6, 2008

(54) SELF REGULATING CHARGE PUMP

(75) Inventor: William Holland, Edinburgh (GB)

(73) Assignee: STMicroelectronics (Research & Development), Limited, Buckinghamshire (GB)

( * ) Notice: Subject to any disclaimer, the term of this patent is extended or adjusted under 35 U.S.C. 154(b) by 128 days.

(21) Appl. No.: 11/351,975

(22) Filed: Feb. 10, 2006

(65) Prior Publication Data

US 2006/0181333 A1 Aug. 17, 2006

(30) Foreign Application Priority Data

Feb. 11, 2005 (EP) .................................. 05250791

(51) Int. Cl.
*G05F 1/10* (2006.01)
*G05F 3/02* (2006.01)

(52) U.S. Cl. .................................................. 327/536

(58) Field of Classification Search ................ 327/536
See application file for complete search history.

(56) References Cited

U.S. PATENT DOCUMENTS

| | | | |
|---|---|---|---|
| 4,433,282 A | 2/1984 | Squires | 323/281 |
| 5,051,881 A | 9/1991 | Herold | 363/60 |
| 5,905,402 A * | 5/1999 | Kim et al. | 327/536 |
| 6,208,196 B1* | 3/2001 | St. Pierre | 327/536 |
| 6,226,194 B1* | 5/2001 | Bayer et al. | 363/60 |
| 6,424,203 B1* | 7/2002 | Bayadroun | 327/536 |
| 2005/0017792 A1* | 1/2005 | Kawagoshi | 327/536 |

FOREIGN PATENT DOCUMENTS

EP 1349030 1/2003

* cited by examiner

*Primary Examiner*—Quan Tra
(74) *Attorney, Agent, or Firm*—Lisa K. Jorgenson; Allen, Dyer, Doppelt, Milbrath & Gilchrist, P.A.

(57) ABSTRACT

A charge pump includes a transistor of the charge pump modified to regulate a supply voltage to substantially reduce noise from the supply voltage when charging the capacitor of the charge pump and subsequently reduces noise at the voltage output. The charge pump may have a regulating transistor for charging or for pumping or for both. The regulating transistor requires a regulated bulk voltage and a modulated gate voltage to enable regulation of the supply voltage. The regulated bulk voltage may be supplied by a small regulator.

17 Claims, 3 Drawing Sheets

SELF REGULATING CHARGE PUMP

FIELD OF THE INVENTION

The present invention relates to charge pumps and particularly, but not exclusively, to charge pumps for use in an image sensor.

BACKGROUND OF THE INVENTION

In mobile applications, circuits are increasingly required to be more power efficient and are required to run off an ever decreasing power supply. Unfortunately, not all circuits function well with low power supplies, including pixels in an image sensor. In order to compensate for a lower power supply, an on-board voltage doubler is often used, which creates higher voltage supplies for circuits such as pixels. A common form of voltage doubler is the charge pump.

Charge pumps are noisy circuits. They work by doubling a reference supply, and so noise on this reference is effectively sampled, and doubled. In order to make a quieter supply, the reference supply is often regulated, so that the sampled noise is less. This has the drawback that there is a high current overhead required as the regulator should be able to supply large current spikes.

SUMMARY OF THE INVENTION

According to a first aspect of the invention there is provided a charge pump having a voltage output, a first voltage and a second voltage of a lesser value. The charge pump may comprise a pump capacitor, and a first pump switching device connected in series between the first voltage and a first side or terminal of the pump capacitor and a second pump switching device connected in series between a second side or terminal of the pump capacitor and the voltage output. The charge pump may also include a charge switching device connected in series between the second voltage and the first side of the pump capacitor, and a charging transistor connected in series between the first voltage and the second side of the pump capacitor. The charging transistor may regulate the first voltage to substantially reduce noise from the first voltage when charging the pump capacitor and subsequently at the voltage output.

The charging transistor may comprise a gate input to which a modulated voltage is applied and a bulk or body input to which a first regulated voltage is applied. The first pump switching device may comprise a pump transistor for regulating the first voltage to provide a second regulated voltage.

The pump transistor may comprises a gate input to which a modulated voltage is applied and a bulk input to which a second regulated voltage is applied. The first pump switching device, the second pump switching device and the charge switching device may comprise transistors operated as switches.

Further, the first pump switching device and the second pump switching device may comprise p-type transistors and the charge switching device is an n-type transistor. The charging transistor may be an n-type transistor.

The modulated voltage may be varied between the regulated voltage and the regulated voltage plus a nominal voltage, the nominal voltage enabling the modulated voltage to swing either side of the first voltage.

The regulated voltage may be supplied by a regulator supplied by a bandgap voltage or similar on-board reference voltage. The modulated voltage may be generated by alternating between the regulated voltage and the regulated voltage plus a DC offset. The first voltage may be a voltage supply and the second voltage may be ground.

According to a second aspect there is provided an image sensor comprising a charge pump as described above for supplying a reference generator for a pixel.

According to a third aspect there is provided an optical pointing device comprising an image sensor as described above. The optical pointing device may be an optical mouse.

According to a fourth aspect there is provided a mobile device comprising the image sensor. The mobile device may be one or more of the following: a mobile cellular telephone; a camera; a portable computer; a Palm device; or a Web Cam.

BRIEF DESCRIPTION OF THE DRAWINGS

Embodiments of the present invention will now be described with reference to the accompanying drawings, in which.

DETAILED DESCRIPTION OF THE PREFERRED EMBODIMENTS

Figure 1:
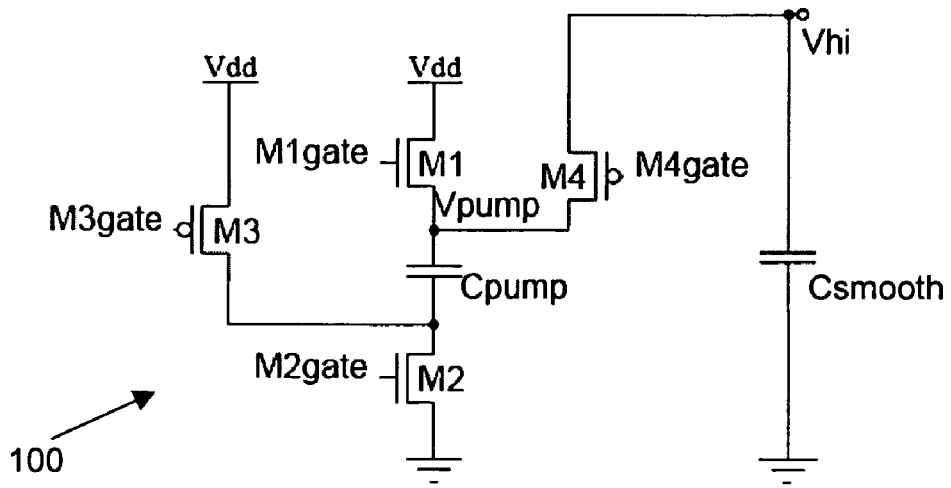
FIG. 1 illustrates a prior art charge pump.
Figure 2:
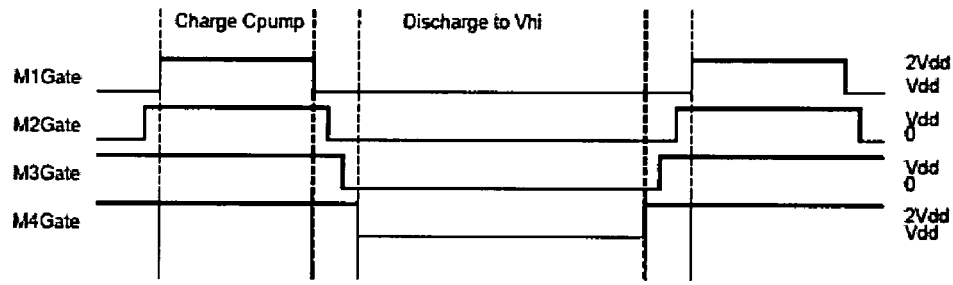
FIG. 2 illustrates a timing diagram for transistors of the prior art charge pump of FIG. 1.

Referring initially to FIGS. 1 and 2, a charge pump 100 comprises two n-type transistors M1, M2, two p-type transistors M3, M4 and a pump capacitor Cpump. An output capacitor Csmooth is also shown where a doubled voltage Vhi is stored. The transistors M1, M2, M3, M4 are operated as switches and therefore can be considered to be open or closed depending on whether the voltage at the respective transistor gate is low or high. The charge pump 100 is also supplied by a power supply Vdd.

Before the charge pump 100 begins operation all transistors are assumed open or "off". As M1 and M2 are n-type transistors, they are open when M1Gate and M2Gate are low. M1 has its source connected to Vdd and therefore M1Gate has to be substantially more than Vdd to open M1. As M3 and M4 are p-type transistors, they are open when M3Gate and M4Gate are high.

When the charge pump 100 begins operation, M1 and M2 are closed allowing the power supply Vdd to charge the pump capacitor Cpump. Once the pump capacitor Cpump is charged, M1 and M2 are opened and M3 and M4 are closed. Opening M3 and M4 connects the power supply Vdd, the pump capacitor Cpump and the output capacitor Csmooth in series. A voltage equivalent to twice the power supply Vdd is then available at Vhi.

Normally the charge pump 100 circuit is duplicated, so that there are two capacitors Cpump, one being charged from Vdd, while the other being discharged onto Vhi, enabling approximately 2 Vdd to be continuously available at Vhi.

As mentioned previously, charge pumps are typically noisy circuits due to any noise on the supply being effectively sampled, and doubled.

Figure 3:
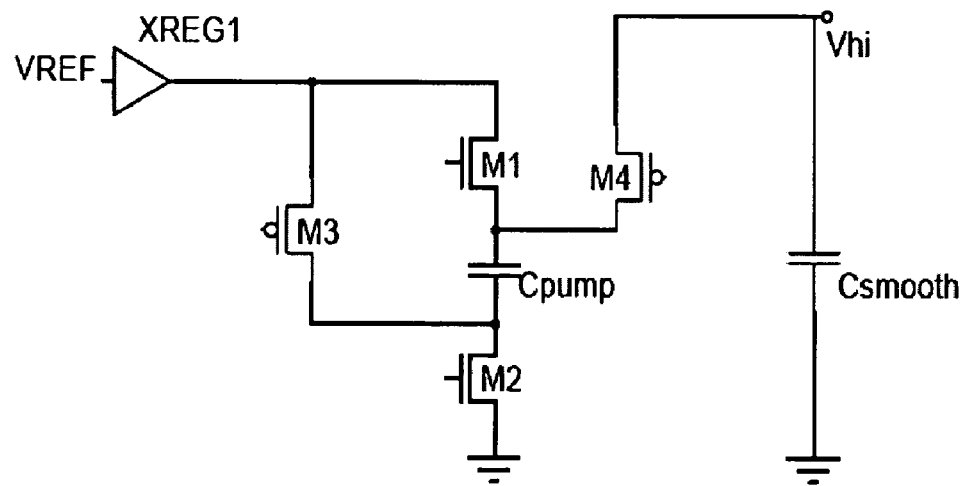
FIG. 3 illustrates a prior art charge pump with a regulated supply.

As shown in FIG. 3, a regulator XREG1 replaces the power supply Vdd to provide a regulated supply that is not as noisy. This has the drawback that there is a high current overhead required as the regulator XREG1 must be able to supply large current spikes.

Figure 4:
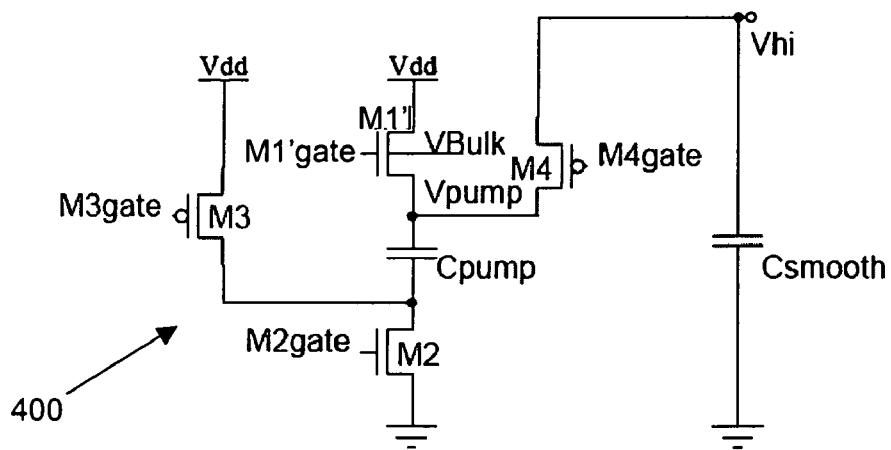
FIG. 4 illustrates a charge pump according to one embodiment of the present invention.
Figure 5:
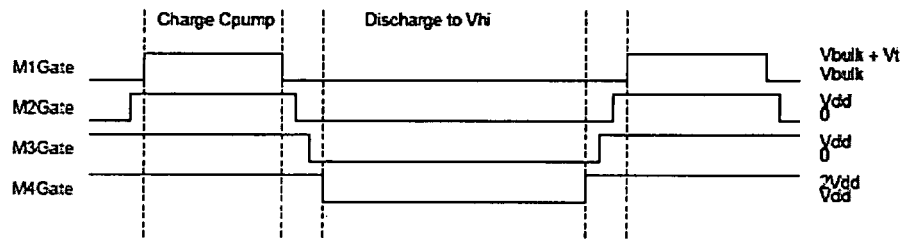
FIG. 5 illustrates a timing diagram for transistors of the charge pump of FIG. 4.

Referring now to FIGS. 4 and 5, a charge pump 400 comprises an n-type charge transistor M2, two p-type pump transistors M3, M4, a pump capacitor Cpump and an n-type charging transistor M1'. Again, an output capacitor Csmooth is also shown where a doubled voltage Vhi is stored. The transistors M2, M3 and M4 are operated as switches and therefore can be considered to be open or closed depending on whether the voltage at the respective transistor gate is low or high. The charge pump 400 is supplied by a power supply Vdd.

When the charge pump 400 begins operation, M2 is closed allowing the power supply Vdd to charge the pump capacitor Cpump. M3 and M4 remain opened.

M1'gate is modulated between Vbulk and Vbulk+Vt such that Vpump is regulated to a voltage of M1'gate-Vt(M1') or Vbulk. In this manner, M1' is not turned fully on but rather M1'Gate is simply Vt above Vpump.

Once the pump capacitor Cpump is charged, M2 is opened and M3 and M4 are closed. In order to switch M1' off, M1'Gate must simply be moved to Vdd or less, thus requiring a swing of a nominal voltage Vt(M1').

Opening M3 and M4 connects the power supply Vdd, the pump capacitor Cpump and the output capacitor Csmooth in series. A voltage equivalent to Vdd+Vbulk is then available at Vhi.

In the prior art charge pump 100, VBulk of M1 could be held at Vdd, as M1 would diode connect if the level of CPump was too low. In the present circuit, allowing Vbulk to be held at Vdd would create a dependence on Vdd. Consequently, VBulk must be held below Vpump's regulated level, as well as below Vdd. Vbulk could be held at Ground but this will lead to a large bulk effect from M1' and therefore is not desirable. Instead a small regulator can be used to control the level of Vbulk, as this will not require large transient current. The small regulator can also be used for setting the reference level for the M1'gate.

Figure 6:
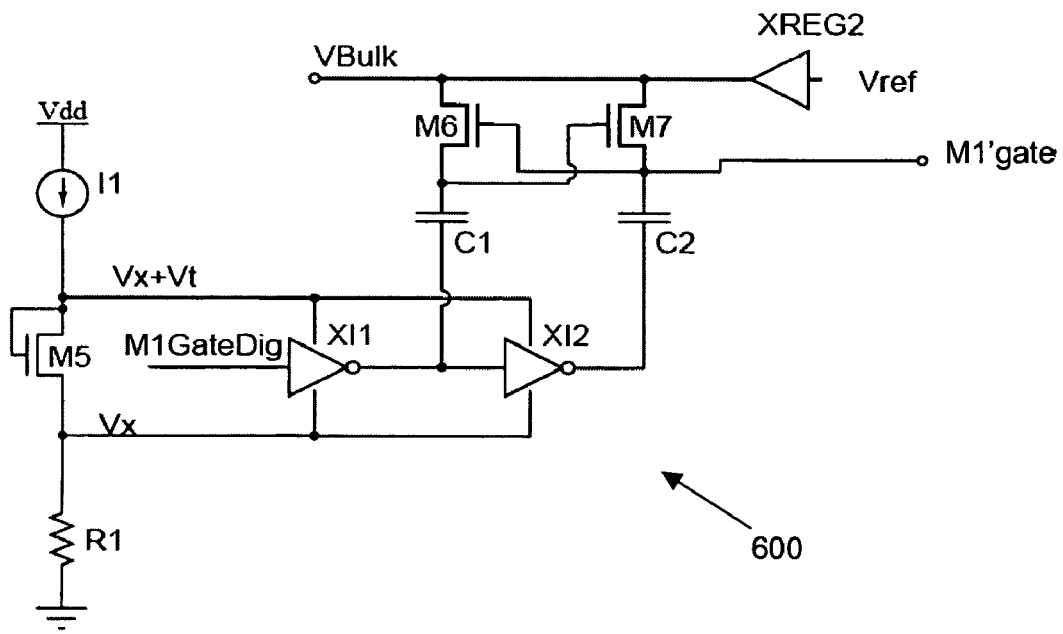
FIG. 6 illustrates a generation circuit for charging transistor M1' of FIG. 4.
Figure 7:
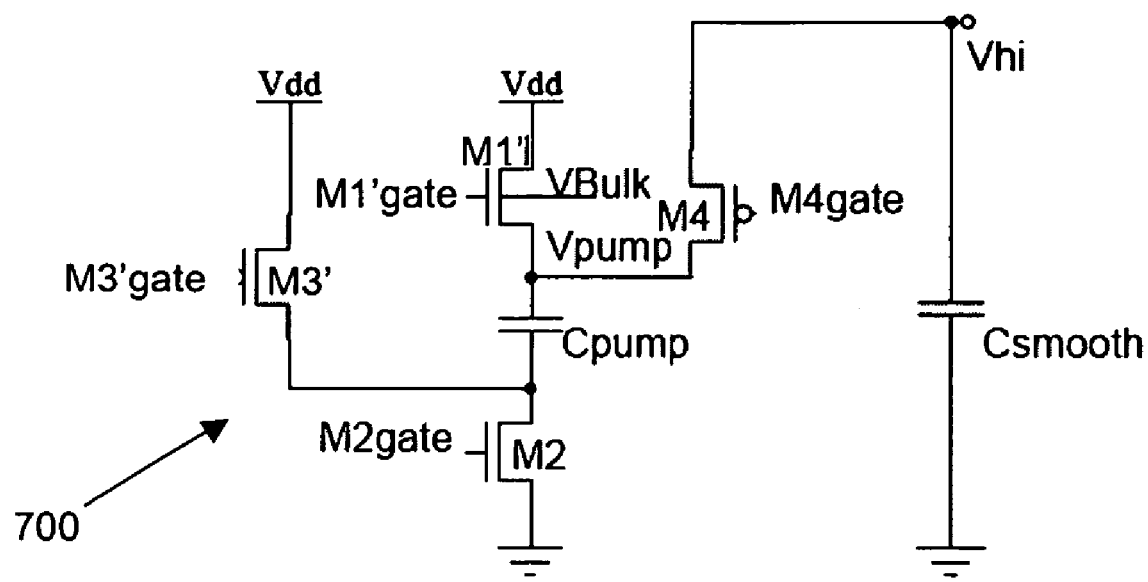
FIG. 7 illustrates a charge pump according to another embodiment of the present invention.

Referring to FIG. 6, a generation circuit 600 includes a current source I1 supplied by a power supply Vdd, a reference transistor M5, having its gate connected to its source, and a resistor R1 connected in series. A voltage Vx is produced between the resistor R1 and the reference transistor M5 and a voltage of Vx+Vt is produced between the current source I1 and the reference transistor M5.

A M1'Gate digital input M1'GateDig provides a "on" or "off" signal for M1', to indicate whether the charge pump 400 should be charging Cpump or pumping voltage to Vhi. The generation circuit 600 then correctly sets M1'gate and Vbulk to allow voltage regulation of Vdd in the charge pump 400.

M1'GateDig is inputted to a first inverter XI1, the output of which is inputted to a second inverter XI2. As the supply lines of the first inverter XI1 and the second inverter XI2 are Vx and Vx+Vt, a "high" at M1'GateDig will give an output of Vx from the first inverter and Vx+Vt from the second inverter. A first capacitor C1 is connected to the output of the first inverter XI1 and a second capacitor C2 is connected to the output of the second inverter XI2.

A bulk regulator XREG2 regulates a reference voltage Vref. Vref is a bandgap voltage or similar on-board reference readily available within circuits of this type. In this case, XREG2 is an amplifier, which amplifies Vref, which is a quiet reference voltage (Vdd is considered noisy), to provide VBulk. For example, Vref may be 1.23V, and VBulk 2.0V.

Vbulk is connected to a first transistor M6 and a second transistor M7. M6 is connected between C1 and Vbulk with M6's gate connected to C2. M7 is connected between C2 and Vbulk with M7's gate connected to C1.

C1 and C2 work as a small charge pump to DC shift the output of the generation circuit M1'Gate. When M1'GateDig is 'high', XI1 outputs a value similar to Vx onto the first capacitor C1, and XI2 outputs a value similar to Vx+Vt onto the second capacitor C2.

During initialization, the DC shift of Vt applied by C2 turns M6 on, which charges C1 to ensure that the DC level is VBulk. When M1'GateDig is subsequently "low", M7 is switched on to ensure that C2 is charged to Vbulk.

When M1'GateDig goes "high" again, M7 is opened (turned off), and XI2 raises the base of C2 by Vt, which in turn raises the node M1'Gate by Vt to Vbulk+Vt. When M1'GateDig goes "low" again the node M1'Gate is not DC shifted and has a value Vbulk. So, as M1'GateDig is varied between "high" and "low", M1'Gate is the modulated between VBulk and VBulk+Vt.

By using the generation circuit 600 and the charge pump 400, the regulator XREG1, which has a high standby current, of the prior art charge pump is no longer required. A bulk regulator XREG2 and current source I1 effectively replaces the regulator XREG1 but the bulk regulator XREG2 has a low standby current, thus making the charge pump 400 more efficient overall while providing a smooth substantially doubled voltage. The circuit arrangement of charge pump 400 also removes the full swing charging of M1Gate between Vdd and 2Vdd with a much lower swing charging of M1'Gate of Vbulk and Vbulk+Vt. As the transistors M1 and M1' are wide devices, they therefore have a large capacitance, and so lowering the voltage swing reduces the FCV (Frequency×Charge×Voltage) current.

In a further embodiment, a charge pump 700 is substantially similar to the charge pump 400 except transistor M3 (FIG. 4) is replaced with a regulating transistor M3'. M3' regulates Vdd during the pumping phase of the charge pump 700 such that the voltage available at Vhi is Vbulk+Vbulk (2Vbulk). M3', as described in this embodiment, is an n-type transistor and therefore would require a voltage swing at M3'Gate of 0V, when off, to Vbulk+Vt when regulating. A suitable generation circuit would be required to provide these voltages at M3'Gate which could be a modification of the generation circuit 600.

Although the devices described in the charge pump circuits 400, 700 are illustrated and described as p-type or n-type transistors, it should be appreciated that the type of transistor may be interchangeable and as such should not be deemed to be limiting. Furthermore, where a transistor is operated as a switch, any appropriate switching device may be used. Improvements and modifications may be incorporated without departing from the scope of the present invention.

That which is claimed is:

1. A charge pump comprising:
   a voltage output;
   a pump capacitor having first and second terminals;
   a first pump switching device connected in series between a first voltage and the first terminal of the pump capacitor;

a second pump switching device connected in series between the second terminal of the pump capacitor and the voltage output;

a charge switching device connected in series between a second voltage less than the first voltage and the first terminal of the pump capacitor;

a charging transistor connected in series between the first voltage and the second terminal of the pump capacitor, the charging transistor regulating the first voltage to substantially reduce noise from the first voltage when charging the pump capacitor and subsequently at the voltage output, the charging transistor comprising a gate input to which a modulated voltage is applied and a bulk input to which a first regulated voltage is applied; and a regulator including a bandgap voltage generator supplying the first regulated voltage and varying the modulated voltage between the first regulated voltage and the first regulated voltage plus a nominal voltage, the nominal voltage enabling the modulated voltage to swing to either side of the first voltage.

2. A charge pump according to claim 1, wherein the first pump switching device comprises a pump transistor for regulating the first voltage to provide a second regulated voltage.

3. A charge pump according to claim 1, wherein the first pump switching device, the second pump switching device and the charge switching device each comprises a transistor operated as a switch.

4. A charge pump according to claim 1, wherein the first pump switching device and the second pump switching device each comprises a p-type transistor, and the charge switching device comprises an n-type transistor.

5. A charge pump according to claim 1, wherein the charging transistor comprises an n-type transistor.

6. A charge pump according to claim 1, wherein the nominal voltage comprises a DC offset.

7. A charge pump according to claim 1, wherein the first voltage is a voltage supply and the second voltage is ground.

8. An electronic device comprising:
at least one charge pump comprising
a voltage output,
a pump capacitor having first and second terminals,
a first pump switching device connected in series between a first voltage and the first terminal of the pump capacitor,
a second pump switching device connected in series between the second terminal of the pump capacitor and the voltage output,
a charge switching device connected in series between a second voltage less than the first voltage and the first terminal of the pump capacitor, and
a charging transistor connected in series between the first voltage and the second terminal of the pump capacitor, the charging transistor regulating the first voltage to substantially reduce noise from the first voltage when charging the pump capacitor and subsequently at the voltage output, the charging transistor comprising a gate input to which a modulated voltage is applied and a bulk input to which a first regulated voltage is applied, and a regulator including a bandgap voltage generator supplying the first regulated voltage and varying the modulated voltage between the first regulated voltage and the first regulated voltage plus a nominal voltage, the nominal voltage enabling the modulated voltage to swing to either side of the first voltage.

9. An electronic device according to claim 8, wherein the first pump switching device comprises a pump transistor for regulating the first voltage to provide a second regulated voltage.

10. An electronic device according to claim 8, wherein the nominal voltage comprises a DC offset.

11. An electronic device according to claim 8, further comprising at least one pixel cooperating with said at least one charge pump.

12. An electronic device according to claim 11, wherein said at least one pixel is for optical pointing.

13. An electronic device according to claim 8, further comprising a portable housing for said at least one charge pump.

14. An electronic device according to claim 13, wherein the portable housing is for at least one of a mobile cellular telephone, a camera, a portable computer, a Palm device, and a Web Cam.

15. A method for making a charge pump comprising a pump capacitor, a first pump switching device connected in series between a first voltage and a first terminal of the pump capacitor, a second pump switching device connected in series between a second terminal of the pump capacitor and a voltage output, and a charge switching device in series between a second voltage less than the first voltage and the first terminal of the pump capacitor, the method comprising:
coupling a charging transistor in series between the first voltage and the second terminal of the pump capacitor;
using the charging transistor to regulate the first voltage to substantially reduce noise from the first voltage when charging the pump capacitor and subsequently at the voltage output; and
using a regulator including a bandgap voltage generator to supply a first regulated voltage to a bulk input of the charging transistor, and to supply a modulated voltage that is varied between the first regulated voltage and the first regulated voltage plus a nominal voltage to a gate input of the charging transistor, the nominal voltage enabling the modulated voltage to swing to either side of the first voltage.

16. A method according to claim 15, wherein the first pump switching device comprises a pump transistor for regulating the first voltage to provide a second regulated voltage.

17. A method according to claim 15, wherein the nominal voltage comprises a DC offset.

* * * * *